Aug. 17, 1954  L. M. KURTZ  2,686,404
ICE-CREAM MAKING PLATE
Filed Sept. 9, 1952
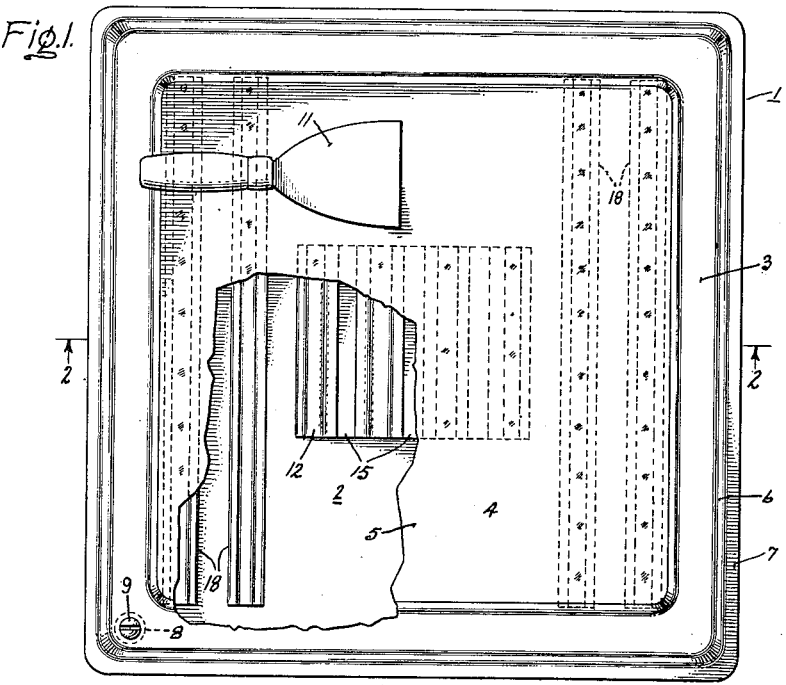
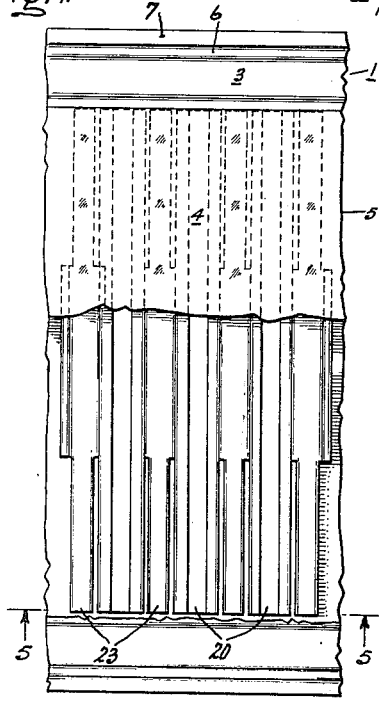
Inventor:
Lowell M. Kurtz,
by *Sheridan ...*
His Attorney.

Patented Aug. 17, 1954

2,686,404

UNITED STATES PATENT OFFICE 2,686,404

ICE-CREAM MAKING PLATE

Lowell M. Kurtz, Erie, Pa., assignor to General Electric Company, a corporation of New York Application September 9, 1952, Serial No. 308,535

6 Claims. (Cl. 62—1)

My invention relates to the making of ice cream or the like and pertains more particularly to a means for making ice cream or the like in the home.

A desirable accessory to household refrigerators and home freezers is a low cost device whereby ice cream or the like may be made manually and quickly. Accordingly, the primary object of my invention is to provide a freezing device for making ice cream or the like manually and quickly by utilizing the freezing effect of refrigeration apparatus as found in household refrigerators or home freezers.

Another object of my invention is to provide a low cost freezing device adapted for being cooled by refrigeration apparatus found in household refrigerators or home freezers and for serving exteriorly thereof in a variety of capacities where cooling is required.

Still another object of my invention is to provide, with a freezing device including spaced substantially flat walls, improved means tending to maintain the walls in the substantially flat condition thereof.

Further objects and advantages of my invention will become apparent as the following description proceeds and the features of novelty which characterize my invention will be pointed out with particularity in the claims annexed to and forming a part of this specification.

In carrying out the objects of my invention, I provide a freezing device comprising a chamber including spaced walls. The chamber contains a solution that fills the space between the walls and is adapted for freezing when the chamber is exposed to suitably low temperatures. A member is carried by one of the walls and projects towards the other of the walls and another member is carried on the other wall and projects towards the first wall with the members being in camming engagement. At least one of the members is resilient. The members resist distortion of the walls during expansive movement of the walls resulting from freezing of solution and draw the walls toward each other upon melting of the solution. The members also provide heat transfer paths from the walls into the solution.

For a better understanding of my invention, reference may be had to the accompanying drawing in which Fig. 1 is a plan view of my invention partly broken away to illustrate distortion resisting means provided therein; Fig. 2 is a section taken along the line 2—2 in Fig. 1 and looking in the direction of the arrows; Fig. 3 is an enlarged fragmentary detail sectional view further illustrating the distortion resisting means; Fig. 4 is a fragmentary plan view illustrating a modification of the distortion resisting means; and Fig. 5 is a section taken along the line 5—5 in Fig. 4 and looking in the direction of the arrows.

In Fig. 1, the device of my invention is shown as a rectangular and substantially flat chamber 1. While it is not essential to the invention that the chamber 1 be either rectangular or flat, it will be seen that the chamber when so formed is adapted for facilitated arrangement and for occupying a minimum of space in a refrigerator or freezer (not shown). As better seen in Fig. 2, the chamber 1 comprises a substantially flat lower wall or plate 2 and an upper wall or plate 3, both of which are preferably formed of a good heat conductive material such as aluminum or copper. The upper plate 3 is formed to provide a depression 4 having a substantially flat bottom 5. The upper plate 3 is further formed to include sides 6 having flanged edges 7. The flanged edges 7 on the sides of the upper plate are secured in a leak-proof manner, as by welding, to the adjacent edges of the lower plate 2.

Suitably secured in an aperture in one corner of the upper plate 3 and extending into the space between the upper and lower plates is a filler plug 8. The filler plug 8 is internally threaded and receives in threaded engagement a plug screw 9. The filler plug 8 permits filling of the chamber 1 with a charge indicated by 10 in Fig. 2 of a freezing or eutectic solution, and the screw 9 when tightly threaded into the plug 8 seals the solution charge in the chamber.

The eutectic solution may be of any suitable substance; however, I choose to employ an aqueous solution of .197 part of potassium chloride by weight which freezes at approximately 12.8° F. When the chamber 1 is exposed to a satisfactorily low temperature for a sufficient length of time, the eutectic solution 10 becomes frozen. Thereafter the utectic solution 10 and, therefore, the chamber 1 remain at a temperature of approximately 12.8° for an extended period of time.

The capacity of the chamber 1 is such as to hold approximately one gallon of the potassium chloride solution 10. This one gallon of the eutectic solution freezes completely when the chamber 1 is in heat exchange relation overnight with freezing means operating at approximately 0° F. This freezing means may be either the evaporator in a refrigerator or a home freezer. When the solution is to be cooled in a refrigerator, means may be provided for holding the chamber 1 adjacent the evaporator therein. When the solution is to be cooled in a home freezer, the chamber 1 may be simply inserted in the freezer or means may be provided for holding the chamber adjacent one of the freezing surfaces in the freezer.

Following freezing of the eutectic solution 10 in the manner just described, the chamber 1 may be taken out of heat exchange relation with the freezing means and utilized for making ice cream or the like. This is accomplished by placing the device in a convenient location, such as on a table, and covering at least a portion of the bottom 5 of the depression 4 with a thin layer of a mixture for making ice cream or the like. This mixture may be prepared at home or purchased at dairies and similar establishments. It will be seen that the provision of the depression 4 is not essential to the method, since the mixture could be poured on a flat surface of chamber 1, such as the lower plate 2. The depression 4 is provided, however, since it permits an optimum and practical thickness of the mixture to be retained on the chamber. Additionally, the depression 4 facilitates handling of the mixture on the chamber. The 12.8° temperature at which the solution 10 tends to remain is lower than the freezing point of the mixture to be frozen. Therefore, when the depression bottom 5 is covered with the mixture in this manner, heat transfers from the mixture to the frozen eutectic solution 10 and the mixture is thereby caused to freeze to the depression bottom 5.

Thereafter, by utilizing a spatula indicated by 11 or any other utensil having a substantially wide edge blade, the frozen mixture is alternately and repeatedly scraped from the depression bottom 5 and then respread over the depression bottom. In this manner, a quantity of frozen mixture is obtained which is smooth and substantially free of ice crystals. This quantity of frozen mixture may be removed from the depression 4 or pushed to one side thereof and the above-described process may be repeated. I have found that optimum freezing of the mixture and ease of handling the mixture is obtained when the depth of mixture placed on the depression bottom 5 does not exceed approximately ¼ inch. With my device, including the one gallon charge 10 of potassium chloride solution adapted for freezing at approximately 12.8° F., and following my method, approximately 1½ quarts of frozen mixture of a satisfactory consistency may be obtained manually and quickly.

It will be seen, of course, that the freezing capacity of my device depends upon the type and quantity of the eutectic solution charge employed and may be varied by varying these factors. It will be seen further that the chamber 1, when the solution charge 10 therein is either frozen or merely cooled, may be employed for a variety of purposes other than the making of ice cream or the like. For instance, receptacles containing drinks, salads and other refreshments could be supported on the chamber 1 for having the contents of such receptacles cooled by heat transfer to the eutectic solution 10.

As seen in Figs. 1, 2 and 3, means are provided in the chamber 1 for resisting distortion of the walls of the chamber during expansive movements of the walls resulting from freezing of the solution 10. This means includes a plurality of spaced apart resilient members or channels 12 secured at the bases 13 thereof, as by welding, to the inner side of the upper wall 3, and specifically to the inner side of the bottom 5 of the depression 4 formed in the upper wall. The members 12 include resilient side portions 14 which are inclined and project outwardly and downwardly toward the opposite or lower wall 2. The distortion resisting means further includes a second plurality of spaced apart resilient members or channels 15 secured at the base 16 thereof, as by welding, to the inner side of the lower wall 2. The members 15 include resilient side portions 17 which are also inclined and project outwardly and upwardly toward the upper wall 3 between the first-mentioned resilient members 12. In this arrangement, the sides 14 of the resilient members 12 secured to the upper wall 3 are in camming engagement with the sides 17 of the resilient members 15. As seen in Figs. 1 and 2, the cooperating members 12 and 15 are disposed in the central portions of the upper and lower walls 2 and 3, respectively, or in other words, where the expansion of the walls would be greatest when the solution 10 freezes. When the solution 10 does freeze and the upper and lower walls of the chamber 1 expand and move oppositely in the manner shown in Fig. 3, the sides 14 of the upper members 12 cooperate with the sides 17 of the lower members 15. The resilience of the side portions of the members 12 and 15 is such that the side portions are initially depressed by each other and permit some expansive movement of the chamber walls. However, thereafter the camming engagement of the side portions 14 and 17 is effective for resisting continued expansive movement and distortion of the upper and lower chamber walls.

When the frozen solution 10 melts, the camming engagement of the side portions of the members 12 and 15 effectively draws the upper and lower walls of the chamber toward each other. Thus, the walls of the chamber are maintained substantially flat during freezing and melting of the solution. Maintenance of the upper wall 3, and more specifically the bottom 5 of the depression 4, substantially flat, facilitates scraping of the frozen mixture from the depression bottom and respreading the mixture thereover by means of the spatula 11 or any other wide edge utensil. Maintenance of the lower wall 2 substantially flat prevents the chamber from tending to revolve on a high portion when the upper side is being used for making ice cream or the like.

As seen in Figs. 1 and 2, I have provided other members or channels 18 disposed on either side of the members 12 and 15. The members 18 are secured to the inner side of the depression bottom 5 and extend across the depression bottom. The members 18 do not cooperate with other similar members, but together with the members 12 secured to the depression bottom 5 serve to provide heat transfer paths from the depression bottom 5, and therefore the mixture thereon, into the frozen solution 10. In a similar manner, the members 15 secured to the lower wall 2 serve as heat transfer paths into the solution 10.

In assembling the chamber 1, the upper wall 3 to which the members 12 are secured is positioned so that the members 12 are to one side of the members 15 on the lower wall 2 and aligned with the spaces between the members 15. Then, by sliding the upper wall 3 sidewise, the members 12 are inserted into the spaces between the members 15 and the edges of the lower wall 2 are caused to register with the edges of the flange 7 on the upper wall. Thereafter the edges of the flange and the lower wall are welded. This renders the chamber 1 leakproof and secures the arms 14 on the members 12 in camming engagement with the arms 17 on the members 15 for the purposes set forth above.

It will be seen that I have employed members formed as channels merely as a production expedient. Resilient members of any configuration may be secured to the inner side of the depression bottoms and be adapted for camming engagement with similar members secured to the inner side of the lower wall 2. Additionally, the pluralities of members secured to the depression bottom and the lower wall need not both be resilient. Either could be rigid and they would still cooperate to resist distortion.

In Figs. 4 and 5, I have shown the chamber 1 as being provided with modified means for resisting distortion of the upper and lower walls thereof. In the modification, a plurality of spaced resilient members or channels 20 are secured at the bases 21 thereof as by welding to the inner side of the lower wall 2. The channel members 20 include resilient side portions 22 which are inclined throughout their lengths and project outwardly and upwardly toward the opposite or upper wall 3. Additionally, the members 20 extend substantially across the chamber beneath the depression bottom 5. The modified form further includes a second plurality of spaced apart resilient members or channels 23 secured at the bases 24 thereof as by welding to the inner side of the depression bottom 5. The members 23 extend across the depression bottom 5 and include resilient side portions which project downwardly between the spaced apart members 20. The members 23 include side portions 25 which are vertical and other side portions 26 which are inclined and project outwardly for being in camming engagement and cooperating with the outwardly projecting side portions 22 of the members 20. The vertical side portions 25 are located at the ends of the members 23 and the inclined or outwardly projecting side portions 26 are located beneath the central portion of the depression bottom 5. The vertical side portions 25 are provided on the ends of the members 23 for allowing the members 20 to clear the side edges 6 of the upper wall 3 when during assembly of the chamber the members 20 are inserted between the members 23. It will be seen that the side portions 25 need not be vertical but could be inclined inwardly from the vertical. This modified arrangement resists distortion of the chamber walls and provides heat paths into the solution 10 in the manner and for the purpose described above.

While I have shown and described specific embodiments of my invention, I do not desire my invention to be limited to the particular forms shown and described and I intend by the appended claims to cover all modifications within the spirit and scope of my invention.

What I claim as new and desire to secure by Letters Patent of the United States is:

1. Means for making ice cream or the like comprising; a chamber including spaced walls, said chamber containing a freezing solution, said freezing solution filling the space between said walls, a member carried by one of said walls and projecting toward the other of said walls, another member carried on said other wall and projecting toward said first-mentioned wall, said members being in camming engagement, at least one of said members being resilient, said members resisting distortion of said walls during expansive movements of said walls resulting from freezing of said solution, said members drawing said walls toward each other upon melting of said solution, said members providing heat transfer paths from said walls into said solution, said solution freezing when said chamber is exposed to suitably low temperatures, one of said walls having a depression formed therein, said depression being adapted for holding a thin layer of a mixture for making ice cream or the like in heat exchange relation with said frozen solution thereby to freeze said mixture to the bottom of said depression, and said bottom of said depression being shaped to facilitate scraping of frozen mixture from and respreading of said frozen mixture on said bottom of said depression thereby to obtain a satisfactory frozen mixture consistency.

2. A freezing device comprising; a chamber including spaced walls, said chamber containing a solution, said solution filling the space between said walls, said solution being adapted for freezing when said chamber is exposed to suitably low temperatures, a member carried by one of said walls and projecting toward the other of said walls, and another member carried on said other wall and projecting toward said first-mentioned wall, said members being in camming engagement, at least one of said members being resilient, said members resisting distortion of said walls during expansive movements of said walls resulting from freezing of said solution, said members drawing said walls toward each other upon melting of said solution, said members providing heat transfer paths from said walls into said solution.

3. A freezing device comprising; a chamber including substantially flat spaced walls, said chamber containing a solution, said solution filling the space between said spaced walls, said solution being adapted for freezing when said chamber is exposed to suitably low temperatures, a resilient member secured to the inner side of one of said walls, said resilient member including an inclined portion projecting toward the other of said walls, and a second resilient member secured to the inner side of said other wall, said second resilient member including an inclined portion projecting toward said first-mentioned wall, said inclined portions being in camming engagement, said inclined portions resisting distortion of said walls during expansive movement of said walls resulting from freezing of said solution, said inclined portions returning said walls to the initially substantially flat condition thereof upon melting of said solution, said inclined portions providing heat transfer paths from said walls into said solution.

4. A freezing device comprising; a chamber including substantially flat spaced walls, said chamber containing a solution, said solution filling the space between said spaced walls, said solution being adapted for freezing when said chamber is exposed to suitably low temperatures, a plurality of spaced apart resilient channels secured to the inner side of one of said walls, said channels including side portions projecting outwardly and toward the other of said walls, a second plurality of spaced apart channels secured to the inner side of said other wall, said second plurality of channels including side portions projecting outwardly and between said first mentioned channels, said side portions of said first and second mentioned channels being in camming engagement, said side portions resisting distortion of said walls during expansive movement of said solution resulting from freezing of said solution, said side portions returning said walls to the initially substantially flat condition thereof upon melting of said solution, said channels providing heat transfer paths from said walls into said solution.

5. A freezing device comprising; a chamber including spaced upper and lower walls, said upper wall being formed with a depression, said depression having a substantially flat bottom, said chamber containing a solution, said solution filling the space between said walls, said solution being adapted for freezing when said chamber is exposed to a suitably low temperature, a plurality of spaced apart resilient channels secured to the inner side of said depression bottom, said channels including resilient side portions projecting outwardly and toward said lower wall, a second plurality of spaced apart resilient channels secured to the inner side of said lower wall, said second plurality of channels including resilient side portions projecting outwardly and between said first-mentioned channels, said resilient side portions of said first and said second mentioned channels being in camming engagement, said resilient side portions resisting distortion of said depression bottom during expansive movements of said walls resulting from freezing of said solution, said resilient side portions returning said depression bottom to the substantially flat condition thereof upon melting of said solution, said channels secured to said bottom of said depression providing heat transfer paths from said depression bottom into said solution.

6. A freezing device comprising; a chamber including spaced upper and lower walls, said upper wall being formed with side edges, said upper wall being further formed with a depression, said depression having a substantially flat bottom, said chamber containing a solution, said solution filling the space between said walls, said solution being adapted for freezing when said chamber is exposed to a suitably low temperature, a first plurality of spaced apart resilient channels secured to the inner side of said lower wall, said first plurality of channels extending substantially the width of said lower wall, said first plurality of channels including resilient side portions, said side portions projecting outwardly and toward said upper wall, a second plurality of spaced apart resilient channels secured to the inner side of said depression bottom, said second plurality of channels extending substantially the width of said depression bottom, said second plurality of channels including resilient side portions, said side portions of said second plurality of channels including intermediate portions projecting outwardly and toward said lower wall, said side portions of said second plurality of channels including vertical end portions for permitting insertion of said first plurality of channels between said second plurality of channels over said side edges of said upper wall, said outwardly projecting resilient side portions of said first and second pluralities of channels being in camming engagement for resiliently resisting distortion of said depression bottom during expansive movements of said walls resulting from freezing of said solution, said outwardly projecting side portions returning said depression bottom to the substantially flat condition thereof upon melting of said solution, said second plurality of channels providing heat transfer paths from said depression bottom into said solution.

References Cited in the file of this patent

UNITED STATES PATENTS

| Number | Name | Date |
| --- | --- | --- |
| 662,541 | Miskolczy | Nov. 27, 1900 |
| 1,771,186 | Mock | July 22, 1930 |
| 1,884,428 | Warner | Oct. 25, 1932 |
| 1,978,176 | Steenstrup | Oct. 23, 1934 |
| 2,015,496 | Platt | Sept. 24, 1935 |
| 2,028,806 | Rechtin | Jan. 28, 1936 |
| 2,094,354 | Genova | Sept. 28, 1937 |
| 2,174,455 | Bates | Sept. 26, 1939 |
| 2,260,450 | Guinane | Oct. 28, 1941 |
| 2,487,584 | Patterson | Nov. 8, 1949 |
| 2,539,726 | Claghorn | Jan. 30, 1951 |